United States Patent [19]

Pelz

[11] Patent Number: 4,812,194
[45] Date of Patent: Mar. 14, 1989

[54] PROCESS FOR PRODUCING A LINING MEMBER

[76] Inventor: Peter Pelz, Dieselweg 10, 8192 Geretsried, Fed. Rep. of Germany

[21] Appl. No.: 9,372

[22] Filed: Jan. 30, 1987

[30] Foreign Application Priority Data

Aug. 28, 1986 [DE] Fed. Rep. of Germany ....... 3629222

[51] Int. Cl.⁴ ...................... B29C 43/18; B32B 31/12; C09J 5/02
[52] U.S. Cl. ................. 156/307.3; 156/62.2; 264/135; 264/137; 264/257
[58] Field of Search ............. 264/134, 135, 137, 257; 428/285, 210, 319.9, 903; 156/62.2, 62.4, 307.3

[56] References Cited

U.S. PATENT DOCUMENTS 4,283,457 8/1981 Kolsky et al. .................. 428/285
4,510,201 4/1985 Takeuchi et al. ............ 428/319.9 X

FOREIGN PATENT DOCUMENTS 2937399 4/1981 Fed. Rep. of Germany .
1266097 3/1972 United Kingdom ............... 264/257

Primary Examiner—James Lowe
Assistant Examiner—Jeremiah F. Durkin, II

[57] ABSTRACT

A process for producing a lining member, particularly a covering member, in which a fibrous material in single or multiple layer form is located with a binder preferably comprising a thermosettable polyester resin. Preferably a foam plate support layer is positioned at least on one side of the fibrous material which has been coated with a binder and such is preferably covered with a non-woven fabric layer. The assembly is compressed in a molding press. A ultrafine glass fiber non-woven fabric is used as the fibrous material layer.

2 Claims, 1 Drawing Sheet

PROCESS FOR PRODUCING A LINING MEMBER

BACKGROUND OF THE INVENTION

1. Field of the Invention

The invention lies in the field of processes for producing lining members and lining members so produced.

2. Prior Art

West German Pat. No. DE-OS 29 37 399 discloses a process for producing a lining member in thin-wall form for motor vehicles in which a fibrous material, which preferably contains acrylic and/or polyacrylic fibers, is coated with the binder and then compressed in a molding press at a temperature of 100° to 150° C., at a pressure of 6 to 1 kg/cm$^2$, and in a time of 1.5 to 6 minutes, to achieve a final end product thickness of 1 to 2.5 mm. These process parameters can advantageously be used in the case of the process according to the invention.

The lining member produced according to the aforementioned prior art process has proved to be satisfactory, but has demonstrated a problem in being able to produce a lining member having particularly good acoustic and thermal insulating characteristics, while permitting production thereof in a simple and inexpensive manner.

BRIEF SUMMARY OF THE INVENTION

More particularly, the present invention is directed to an improved process for making lining members, especially covering members. By this process, an assembly of at least one layer of a non-woven fabric of glass fibers is positioned adjacent a plate foam support layer. A thermosettable polyester resin is employed as a binder. The resulting assembly is compressed in a molding press to produce a liner member in a single molding step.

The invention is also directed to the lining members so produced.

According to the invention, the above indicated prior art problem is solved in that the fibrous material is comprised of a non-woven fiber glass fabric made from ultrafine glass fibers. Preferably, a foam plate support supplements the construction for increasing the insulating effect, and the composite product lamination optionally incorporates a non-woven fabric covering.

Particularly advantageous lining member embodiments of the invention can be gathered from the herein provided teachings. Embodiments of such are preferably produced by the inventive process taught herein.

Other and further aspects, objects, aims, purposes, features, advantages, forms applications, embodiments, and the like will be apparent to those skilled in the art from the herein presented teachings.

BRIEF DESCRIPTION OF THE DRAWINGS

Further features and advantages of the invention can be gathered from the following drawings wherein.

DETAILED DESCRIPTION

Figure 1:
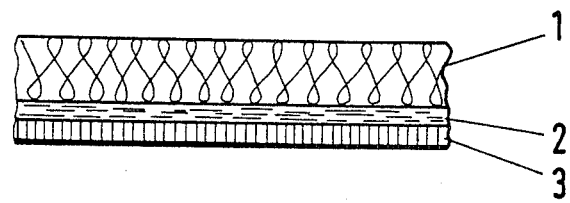
FIG. 1 shows an embodiment of a lining member according to the invention in vertical section such embodiment incorporating a foam layer and a non-woven fiber glass layer.

The inventive process, which is also suitable for realizing a process such as that forming the subject matter of West German patent application No. P36 29 230.0, is based on the surprising finding that it is possible to obtain optimum strength characteristics with a particularly low specific gravity associated with the lining member, provided that the fibrous material is comprised of an ultrafine glass fiber non-woven fabric. Even with a minimum lining member thickness, an excellent rigidity is obtained, and the deformation characteristics resulting therefrom make it possible to meet complicated shape requirements. If, in accordance with a preferred embodiment of the invention, the fiber glass lining member is combined with a foam plate support of the type characterized herein, then, as a result of the functional separation of the overall lining member into a dimensionally stable fiber glass-based support component, and an insulating support comprised of a foam plate as another component, outstanding thermal and acoustical insulating properties are surprisingly obtained. Also, the aforementioned "subdivision" or separation of the functions between the different layers makes it possible to optimize the glass fiber-based layer and also the foam plate support layer, provided that such layers are merely prefabricated. It is also possible to make use of the advantageous characteristics of the inventive subdivision of the aforementioned functions with respect to foam support and fiber glass layer if, instead of the preferred preformed non-woven fiber glass fabric according to the invention, a different fiber glass material is used.

Further improvements in the rigidity, as well as in the thermal and in the acoustical insulating characteristics, are obtained if the action of the separate foam plate layer support is doubled by positioning a foam plate on either side of the fiber glass layer. The resulting lamination can be covered on either one or both sides by a decorative or fibrous material support if desired.

Preferably, a starting layer of non-woven fabric is comprised by ultra fine glass fibers which have a weight ranging from about 200 to 800 g/m$^2$. Preferably, a starting layer of preformed foam support is comprised of a polyester foam or a polyether urethane foam. The foam cell structure can be either open-pore or closed-pore, and preferably has such foam a density of from about 20 to 60 kg/m$^3$. The layer of foam support typically ranges from about 3 to 30 mm in thickness. The synthetic resin binder is preferably a thermosetting polyester resin.

The present invention relates to a coated plate structure adapted for use as for coverings and linings which has very good thermal and acoustical insulating properties, which absorbs little moisture, and which has good strength characteristics. It also has a light weight and offers the possibility in a particularly advantageous manner of integrating into the molding process the fitting of fastening elements for a lining. Compared to known laminates of this type, which suffer from constructional deficiencies in the covering, and which are also unsatisfactory with regard to dimensional stability, so that handling is made more difficult when installing large-area workpieces, the lining member according to the invention avoids the deficiencies and has a number of advantages. Also, the production of the lining member according to the invention is less labor-consuming. In a particularly advantageous form, the laminate produced according to the invention has a cut foam plate support layer with a thickness of about 3 to 30 mm, as well as a fiber glass layer, and such fiber glass layer is covered on the side remote from the foam plate layer with a non-woven fabric. The fiber glass layer and the covering non-woven fabric are coated on one side preferably with unsaturated polyester resin so that they can be joined together with the foam plate support in the compression molding process, such as in the known molding processes for producing fiber mat products, to achieve a desired laminate construction in a single operation.

The resulting construction has, in particular, the following advantages compared with known laminates of a similar type. It has a very good acoustic absorption, a high heat insulating capacity, and a limited moisture absorption. It is to a dimensionally stable workpiece, even in the case of oversize lining members, which greatly facilitates the fitting of such members. The stability and true-to-shape characteristics result from the combination of the high resiliency of the cut foam and the multilayer covering. The dimensional stability is ensured by the cured synthetic resin impregnated, non-woven fiber glass fabric incorporated into the construction, and such stability can be further increased by pressed-in corrugated or compressed webs or ribs. The curred non-woven fabric, which may serve as the covering layer in a preferred embodiment of the invention, protects the glass fiber layer against abrasion and gives the finished workpiece a surface with a good feel. Much as in the process according to DE-OS No. 32 25 820, it is possible to in situ integrate into a lining member in the compression molding process of this invention fastening parts for linings. The lining construction of this invention also makes it possible to carry out compression or compaction in larger or smaller regions of surfaces of the linings, and/or on the edges of the linings, by deep pressing flat durable zones, which serve on the edges as fitting plates or connection points for lining members. As a result of the single compression molding process step, the manufacture of the lining member according to the invention requires little labor expenditure.

In the process according to the present invention, in a particularly advantageous manner, use is made of a non-woven fiber glass fiber composition which is unobjectionable under allergological, and health standpoints, and this feature is further increased by covering with a non-woven fabric. In those areas of a lining member being prodcued in which the compression or molding pressure is not particularly high, the loose characteristics of the foam support are fully retained, so that there is no penetration thereinto of the synthetic resin binder from the non-woven fiber glass fabric. However, where a marked compression of the lining member takes place as a result of a corresponding configuration of the compression mold, the resin binder penetrates into the foam support from the glass fiber mat during the molding process and serves to consolidate such mat in the desired final thickness configuration. The lining member produced according to the invention has an excellent soft feel, and an excellent dimensional stability, and it offers free backing possibilities, without using intermediate foils, for decorative layers, and the like, it being possible to use unfinished backing materials in an inexpensive manner. It is optionally also possible to fit to the lining member in a compression molding process film hinges, or, in general, desired bending regions for producing movable plates, and the like, which further facilitates fitting. A single or two-sided profiling of the lining member is also possible through corresponding shaping of the compression mold.

EMBODIMENTS

The present invention is further illustrated by reference to the following examples.

To illustrate the process according to the invention, the following procedure was adopted in a preferred embodiment: An ultrafine non-woven fiber glass fabric weighing 600 g/m$^2$ was coated on both sides with a total thermosettable polyester resin quantity of 800 g/m$^2$. The thus coated non-woven glass fabric, together with a plate foam support layer having a thickness of 6 mm was then covered by a non-woven fabric layer and placed in a mold and compression molded for five minutes at 145° C. A product lining member was obtained having excellent strength characteristics, and, as a result of the plate foam support layer, demonstrated excellent thermal and acoustical insulation values. Advantageously, and also through the use of the foam plate support layer, no moisture could penetrate. Also, on the side remote from the glass fibers, the lining member had a soft feel.

FIG. 1 shows an embodiment of the invention in which a foam plate support layer 1 is joined to one side of a non-woven fiber glass layer 2 and the other side of layer 2 is covered with a non-woven fabric 3.

Figure 2:
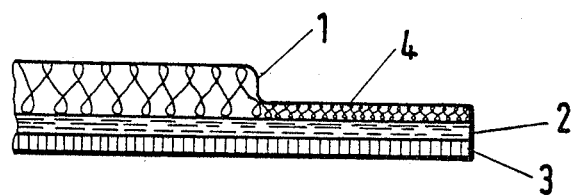
FIG. 2 shows a second embodiment of the invention in a sectional representation similar to that shown in FIG. 1 this embodiment incorporating a deep pressed edge zone.

In the embodiment according to FIG. 2, the assembly constituted by foam plate 1, glass fiber layer 2, and non-woven fabric 3 is provided as in FIG. 1, but here an edge zone 4 is provided which is a durable firm-/semifirm zone brought about by deep pressing zone 4 during molding.

Figure 3:
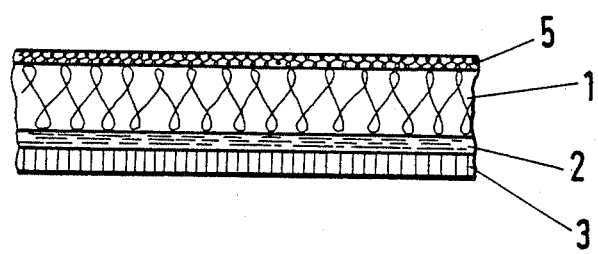
FIG. 3 shows a third embodiment of the invention in a sectional representation similar to that shown in FIG. 1, this embodiment incorporating an additional decorative support layer.

The FIG. 3 embodiment also has a foam plate layer 1, a fiber glass layer 2, and a non-woven fabric layer 3, but here, in addition, there is included a decorative layer 5 overcovering the layer 1.

Figure 4:
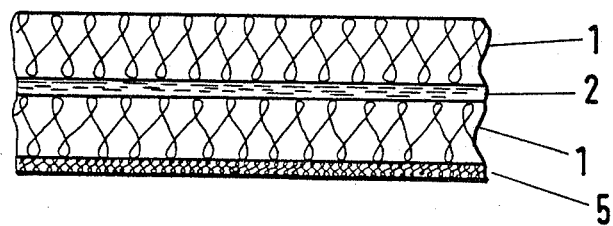
FIG. 4 shows a fourth embodiment of the invention in a sectional representation similar to that shown in FIG. 1, this embodiment incorporating a layer of foam on either side of a non-woven fiber glass layer.

In the FIG. 4 embodiment, a separate foam plate layer 1 provided on either side of a fiber glass layer 2 and a decorative layer 5 is included for covering purposes.

As is apparent from the foregoing specification, the invention is suspectible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:

1. A process for producing a lining member comprising the steps of:
    (a) coating each face of a first layer consisting of a non-woven web of ultra fine glass fibers and weighing 200 to 800 g/m$^2$ with a binder consisting of a thermosettable polyester resin,
    (b) assembling each face of said first layer with a second layer of a preformed foam support layer having a density of from about 20 to 60 kg/m$^3$ and a thickness of from about 3 to 30 mm, (c) covering the product of step (b) with a layer of decorative non-woven fabric, and
(d) compressing the product of step (c) at an elevated temperature to produce (1) dimensionally stable depressions in the surface thereof, (2) firm flat zones in edge-adjacent regions thereof, and (3) corrugated rib-like members in the surface thereof.

2. A process according to claim 1 which includes the step of pressing at least one fastening part in situ into said lining member to incorporate the same into said lining member during said compressing.

* * * * *